Patented Nov. 24, 1925.

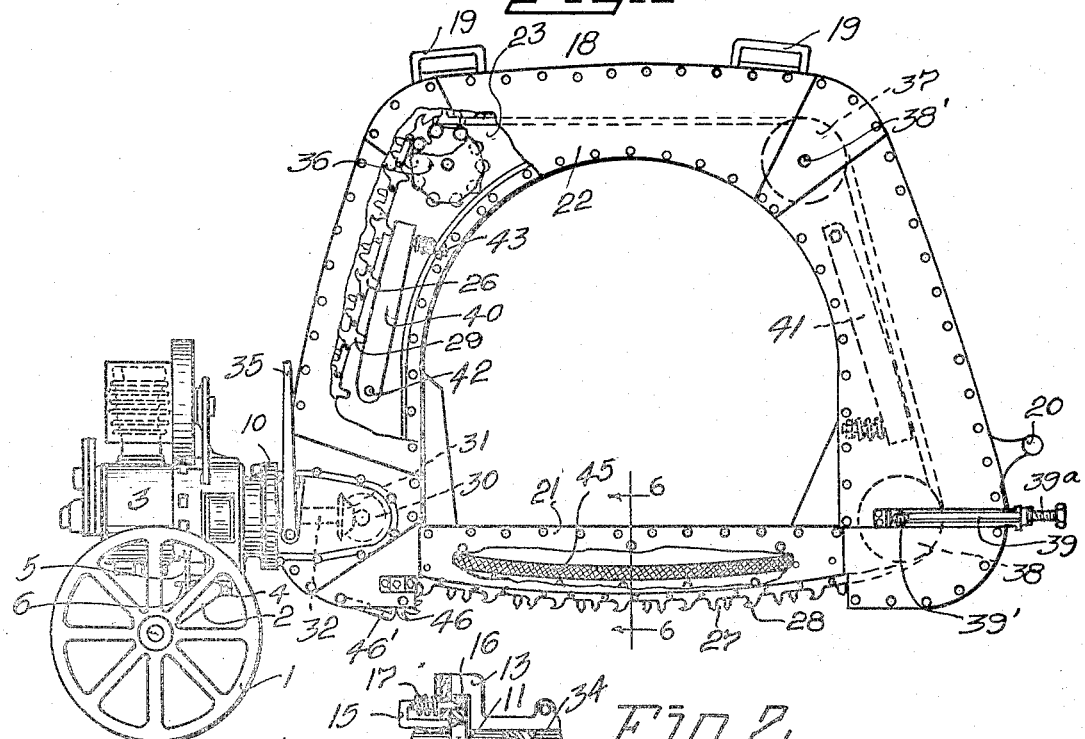

1,562,732

UNITED STATES PATENT OFFICE.

EDWARD P. ARSNEAU, OF MINNEAPOLIS, MINNESOTA, ASSIGNOR TO ARSNEAU & SONS SAW COMPANY, OF MINNEAPOLIS, MINNESOTA, A CORPORATION OF MINNESOTA.

PORTABLE SAWING MACHINE.

Application filed February 15, 1924. Serial No. 693,025.

*To all whom it may concern:*

Be it known that I, EDWARD P. ARSNEAU, a citizen of the United States, residing at Minneapolis, in Hennepin County, and State of Minnesota, have invented certain new and useful Improvements in Portable Sawing Machines, of which the following is a specification.

My present invention relates to improvements in portable sawing machines especially designed for use in felling trees and for cutting this sawed timber into logs. The invention contemplates a comparatively light-weight, portable, power operated sawing machine mounted upon a truck or wheels and manually controlled, which is bodily adjustable with relation to the supporting truck to facilitate the operation of the saw.

The saw and its housing or casing are adjustable with relation to the supporting truck to adapt the saw to operate in a horizontal plane when cutting standing timber and adjustable for operation in vertical plane when cutting the felled timber into logs and also adjustable to operate at angles of different degrees between these adjustments.

In the embodiment of my invention means are also provided for lubricating, and maintaining the tension of the endless chain saw to insure smooth and reliable movement of the device and prevent buckling or whipping of the saw, and other features are introduced as will hereinafter be more specifically set forth for enhancing the the efficiency and operation of the machine.

The invention consists in certain novel features of construction and combinations and arrangements of parts as illustrated in the drawings and set forth in the claims. In the accompanying drawings I have illustrated one complete example of the physical embodiment of my invention wherein the parts are combined and arranged in accordance with the best mode I have so far devised for the practical application of the principles of my invention.

Figure 1 is a view in side elevation of the implement with one end supported on the wheels or truck and in position for transportation, the saw being in position for sawing in a vertical plane on fallen timber, parts of the saw casing being broken away for convenience of illustration.

Figure 2 is an enlarged detail sectional view showing the rotary adjustable joint between the supporting motor casing or frame and the saw frame or casing, with the locking means and cluth mechanism also shown.

Figure 3 is a sectional detail view of the saw casing showing a resilient lateral guide for the endless saw chain.

Figure 4 is an enlarged detail view of one of the guide sprockets for the endless chain saw and illustrating the relation thereto of the saw chain.

Figure 5 is an enlarged detail sectional view through the crank axle showing the means for holding the axle and the machine supported thereby in locked position.

Figure 6 is a transverse sectional view at line 6—6 through the supporting bridge portion of the saw machine.

In carrying out my invention I utilize a two wheel truck at one end of the machine which comprises a pair of wheels 1 and a crank axle 2 for supporting the motor frame indicated as a whole by the numeral 3, the motor being journaled on the crank axle at 4, with the motor supported above the axle and the major portion of its weight at the front of the axle as seen in Figure 1. At the underside of the motor frame or casing brackets 5 are provided and a horizontally disposed locking pin or pawl 6 is slidable in a sleeve 7 of the bracket to engage the teeth of a ratchet wheel 8 on the axle, the spring 9 being utilized to hold the pin in locked position. It will be apparent that the entire machine may be adjusted bodily for elevating it or depressing it with relation to the ground by turning the crank axle, and that this adjustment may be maintained and the parts held in locked position by the use of the pawl and ratchet, and as thus held the entire machine is pivoted through the crank axle in the journals of the wheels.

The motor, although movable in a vertical plane maintains at all times an upright position, while the sawing machine is adjustable with relation thereto and may be swung on its longitudinal axis. For this purpose the motor or engine frame is provided with an annular casting 10 having an exterior annular flange 11 with which a sectional, cylindrical sleeve 12 co-acts. This sleeve has an annular grooved flange 13 to receive the flange of the casting 10, and a retaining ring 14 is secured to the grooved flange to hold the cylindrical casting and the sleeve against longitudinal displacement. It will be understood that the sleeve is capable of rotary movement with relation to the non-rotatable casing, and that the retaining ring holds the parts in operative position.

The casting and sleeve are held in adjusted position by means of the spring yoke or latch 15 which passes through the complementary flanges of the casting and sleeve and the retaining ring, as through holes 16 spaced around these members and designed to register for the purpose, and the spring 17 is used to hold the locking latch in position.

The frame which is designated as a whole by the numeral 18 is rigidly attached to the sleeve 12, and of a somewhat U-shape, and it is provided with a pair of spaced handles 19 intermediate of its ends and an end handle 20. These handles may be grasped for supporting the frame on its truck both for the purpose of transporting the machine and for guiding the operation of the saw. The ends of the U-shape frame are connected by a bridge member 21 which forms a straight connection between the yoke or U-shape frame of the machine. The frame and bridge are both hollow, the former being made up of spaced plates 22 and 23 and the latter of spaced plates 24 and 25, bolted, riveted or otherwise secured together to form a channel between them for the endless chain saw 26.

The chain saw is made up of links having alternating cutting teeth 27 and clearing teeth 28 at the outer edge of the chain, and at the inner side of the chain the alternating links are fashioned with sprocket teeth 29 which co-act with the driving sprocket wheel 30 shown in dotted lines within the saw frame or housing in Figure 1. This driving sprocket is operated by a train or couple of bevel gears 31 within the housing, one of the wheels being revolved from the driven shaft 32 in the sectional sleeve 12, and this driven shaft is revolved from the driving shaft 33 which extends from the motor through the annular casting 10 and into the sleeve 12. A friction clutch device 34 operatively connects these two shafts 32 and 33, and the clutch lever 35 is manipulated to control the operation of the saw with power supplied from the motor or engine.

At spaced intervals within the saw housing are provided guiding sprocket wheels 36, 37 and 38 for the saw chain, shafts 38' for these guide sprockets being journaled in the spaced plates of the housing, and the saw chain passes around the outer sides of these guides as indicated in Figure 1 by dotted lines. The sprocket wheel 36 is shown in Figure 4 as comprising two spaced disks between which are journaled antifriction rollers 36' over which the chain passes and between which the sprocket teeth 29 engage, to guide the chain saw.

The flexible chain saw may be tightened or loosened as required by means of a yoke 39 whch supports the bodily movable shaft 39' of the wheel 38, and the screw bar 39ᵃ may be manipulated for this purpose in well known manner.

To hold the chain saw under proper tension and prevent its buckling or whipping as it passes around the sprocket wheels I employ a pair of guide arms 40 and 41 within the housing, and the latter indicated by dotted lines. These arms are pivoted within the housing as at 42, and the springs 43 are located between the free ends of the arms and the casing or housing to urge the arms into position for contact and guidance of the sprocket teeth of the endless saw chain.

The cutting edge of the chain saw passes across the bridge member 21 with the inner faces of the links riding on the parallel guide edges 44 of the bridge, said edges being fashioned as curved surfaces to give the proper curve to that portion of the saw chain which operates to cut the kerf as it passes through the wood.

The saw may be lubricated by the use of a felt lubricating web or wick 45 located within the hollow bridge, and the oil or other lubricant when placed within the hollow bridge will be uniformly and evenly distributed from the felt lubricating member by contact therewith of the sprocket teeth of the chain links as indicated in Figure 1.

If desired a toothed wheel 46 may be carried in the housing at the forward end of the bridge, which wheel is held in position by means of a pawl 46'. Thus should the traveling saw, moving to the left in Figure 1, drag the work, the latter will be caught by the wheel and held for operation of the saw.

For laterally guiding the flexible saw or saw chain, spring plates 47 illustrated in Figure 3 are used. These are adjusted by means of a pressure bolt threaded in brackets 49, and the spring plates that project through slots in the chain housing may be moved to various positions to guide the chain as it passes through the housing.

With the machine as depicted in Figure 1 it will be apparent that the right end is to be supported by grasping the handle 20, and as the saw chain is operated by the motor, the weight of the machine is gradually imposed on the saw as it cuts through the wood. When sawing standing timber, the frame is turned to horizontal position with one end supported on the motor and the handles 19 are utilized in connection therewith for supporting the machine, the handle 20 also being used for this purpose. The frame may also be turned at angles between the horizontal and vertical when required, and it will be obvious that the machine may be manipulated and controlled in its operations for rapid and effective performance of its functions.

Having thus fully described my invention, what I claim is new and desire to secure by Letters Patent is—

1. The combination in a sawing machine with a supporting truck, and a motor pivoted thereon to permit vertical adjustment of the machine, of a non-rotatable joint member rigid with the motor, a saw frame and endless chain saw, a joint member rigid with the saw frame and rotatable with relation to said non-rotatable member in a plane at right angles to the vertical adjustment of the machine, means for retaining said two members in operative position, and connections from the motor for operating the saw.

2. The combination in a sawing machine with a supporting truck and a motor pivoted thereon to permit vertical adjustment of the machine, of an annular flanged casting on said motor, a saw frame and endless chain saw, a circular sleeve on said frame whereby the frame may be swung in a plane at an angle to the vertical adjustment of the machine, means for holding said casting and sleeve in relatively rotated positions, and driving connections between said motor and chain saw.

3. In a portable manually controlled sawing machine the combination with a truck having a crank axle and a motor pivoted on said axle for vertically adjusting the machine, of a saw frame and endless chain saw therein, a joint between said frame and motor adapted to permit rotary adjustment of the frame with relation to the motor at an angle to the plane of vertical adjustment of the machine, and driving connections between said motor and saw.

4. In a sawing machine the combination with a housing having guide sprockets therein, an endless chain saw on said sprockets and operating means therefor, of pivoted guide arms between pairs of sprockets within said housing for the chain saw and springs at the free ends of said arms for holding said arms in operative position against the inner edge of the chain.

In testimony whereof I affix my signature.

EDWARD P. ARSNEAU.